US010671977B2

(12) United States Patent
Caldwell et al.

(10) Patent No.: US 10,671,977 B2
(45) Date of Patent: *Jun. 2, 2020

(54) MANAGEMENT TEAM MAILBOX INTEGRATING EMAIL REPOSITORY AND CONTENT MANAGEMENT STORE SERVICES

(71) Applicant: MICROSOFT TECHNOLOGY LICENSING, LLC, Redmond, WA (US)

(72) Inventors: Nicholas Caldwell, Bellevue, WA (US); Benjamin Childs, Seattle, WA (US); Venkat Pradeep Chilakamarri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,016

(22) Filed: Apr. 30, 2018

(65) Prior Publication Data

US 2018/0253693 A1    Sep. 6, 2018

Related U.S. Application Data

(63) Continuation of application No. 15/285,594, filed on Oct. 5, 2016, now Pat. No. 9,984,358, which is a
(Continued)

(51) Int. Cl.
*G06F 15/16* (2006.01)
*G06Q 10/10* (2012.01)
(Continued)

(52) U.S. Cl.
CPC ..... *G06Q 10/107* (2013.01); *H04L 29/08072* (2013.01); *H04L 51/22* (2013.01); *H04L 67/02* (2013.01); *H04L 69/329* (2013.01)

(58) Field of Classification Search
CPC . G06Q 10/107; H04L 29/08072; H04L 51/22; H04L 67/02; H04L 69/329
(Continued)

(56) References Cited

U.S. PATENT DOCUMENTS 8,131,807 B2 * 3/2012 Fukumoto ............ G06Q 10/107
709/206
8,190,642 B2 * 5/2012 Boss ..................... G06Q 10/00
707/791
(Continued)

OTHER PUBLICATIONS

"Dream Fire", Retrieved from <<http://web.archive.org/web/20111015153126/http://dreamfireinteractive.com/case_studies/universal-mailing-dreamfire-way>>, Retrieved Date: Nov. 16, 2011, 2 Pages.
(Continued)

*Primary Examiner* — Alan S Chou
(74) *Attorney, Agent, or Firm* — Talem IP Law, LLP

(57) ABSTRACT

A communication application creates a team mailbox integrating messages from an email repository and documents from a content management store (CMS). The application enables an administrator to define and manage members of the team mailbox with varying privilege status for accessing the team mailbox. Content such as aggregated messages and associated documents are displayed through a unified view to standardize ease of access. The members are enabled to receive messages sent to the team mailbox by others. Policies inherited from email repository, CMS, and/or third party policy providers are enforced within the team mailbox.

20 Claims, 8 Drawing Sheets

Related U.S. Application Data continuation of application No. 13/353,809, filed on Jan. 19, 2012, now Pat. No. 9,497,152.

(51) Int. Cl.
*H04L 29/08* (2006.01)
*H04L 12/58* (2006.01)

(58) Field of Classification Search
USPC .................................................. 709/207
See application file for complete search history.

(56) References Cited

U.S. PATENT DOCUMENTS

| | | | |
|---|---|---|---|
| 8,548,433 B1 | 10/2013 | Othmer et al. | |
| 9,224,132 B1 | 12/2015 | Knox et al. | |
| 9,497,152 B2* | 11/2016 | Caldwell | G06Q 10/107 |
| 9,984,358 B2* | 5/2018 | Caldwell | G06Q 10/107 |
| 2002/0087646 A1* | 7/2002 | Hickey | G06Q 10/10 |
| | | | 709/206 |
| 2003/0135565 A1* | 7/2003 | Estrada | G06Q 10/10 |
| | | | 709/206 |
| 2005/0021638 A1 | 1/2005 | Caldini et al. | |
| 2005/0160145 A1 | 7/2005 | Gruen et al. | |
| 2006/0010213 A1 | 1/2006 | Mehta | |
| 2007/0025340 A1 | 2/2007 | Bettis et al. | |
| 2007/0100950 A1 | 5/2007 | Bornstein et al. | |
| 2008/0183827 A1 | 7/2008 | Rege et al. | |
| 2008/0306972 A1 | 12/2008 | Wilkin et al. | |
| 2011/0010635 A1 | 1/2011 | Fox et al. | |
| 2011/0029622 A1 | 2/2011 | Walker et al. | |
| 2011/0093544 A1 | 4/2011 | Yasrebi et al. | |
| 2011/0153762 A1 | 6/2011 | Brabec et al. | |
| 2013/0117419 A1* | 5/2013 | Alarid | G06Q 10/107 |
| | | | 709/219 |

OTHER PUBLICATIONS

"Email & Calendar", Retrieved from <<http://web.archive.org/web/20110711132712/http://www.ucl.ac.uk/isd/staff/mail/live/how-to/shared-mailboxes>>, Nov. 16, 2011, 7 Pages.

"One Desk Collaboration Inbox", Retrieved from <<http://web.archive.org/web/20111115083655/http://www.onedesk.com/features/collaboration-inbox/>>, Retrieved Date: Nov. 16, 2011, 4 Pages.

"Use Groups to Create Shared Mailboxes", Retrieved from <<http://web.archive.org/web/20111108174323/http://www.google.com/support/a/bin/answer.py?answer=167430>>, Retrieved Date: Nov. 16, 2011, 3 Pages.

"Final Office Action Issued in U.S. Appl. No. 13/353,809", dated Jan. 6, 2014, 30 Pages.

"Final Office Action Issued in U.S. Appl. No. 13/353,809", dated May 4, 2015, 30 Pages.

"Non Final Office Action Issued in U.S. Appl. No. 13/353,809", dated Dec. 24, 2014, 32 Pages.

"Non Final Office Action Issued in U.S. Appl. No. 13/353,809", dated Jun. 10, 2013, 27 pages.

"Notice of Allowance Issued in U.S. Appl. No. 13/353,809", dated Jul. 19, 2016, 16 Pages.

Patricio, Anderson, "Managing Resource Mailboxes in Exchange Server 2007 (Part 1)", Retrieved from <<http://www.msexchange.org/articles-tutorials/exchange-server-2007/management-administration/managing-resource-mailboxes-exchange-server-2007-part1.html>>, Sep. 27, 2007, 9 Pages.

\* cited by examiner

MANAGEMENT TEAM MAILBOX INTEGRATING EMAIL REPOSITORY AND CONTENT MANAGEMENT STORE SERVICES

CROSS REFERENCE TO RELATED APPLICATION

This Application is a continuation under 35 U.S.C. § 120 of co-pending U.S. patent application Ser. No. 15/285,594 filed on Oct. 5, 2016, which is a continuation under 35 U.S.C. § 120 of U.S. patent application Ser. No. 13/353,809 filed on Jan. 19, 2012, now U.S. Pat. No. 9,497,152 issued on Nov. 15, 2016. The U.S. Patent Application and U.S. Patent are herein incorporated by reference in their entireties.

BACKGROUND

Groups of people working together on a project have multiple resources for collaboration. One of the most common methods is to setup a discussion board or email alias in which team members can communicate by leaving messages for one another. For impromptu group communications, discussion boards and email aliases enable simple but quick communications among the group members. Over a span, a message board becomes a repository of useful knowledge about a project.

Another mechanism for collaboration is document sharing. Modern repository solutions such as content management stores (CMS) allow users to create expansive document repositories. A CMS manages and coordinates access to large numbers of files. Modern CMS systems provide full feature security models, real-time authoring, and other features such as project coordination through task and calendar features.

Modern collaboration solutions lack the dynamic natures of message board collaboration solutions and full document sharing features of CMS solutions. Existing systems implement multiple applications to provide separate solutions to messaging and file sharing demands. System collaboration is lackluster and lack integrated features sets.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to managing a team mailbox integrating email repository and content management store services. According to some embodiments, a communication application may create a team mailbox according to a received configuration from an administrator with or without members. The application may manage a membership having one or more members in the team mailbox in response to detecting instructions from the administrator or a member. Other users may be enabled to send communications to the team mailbox as a whole, rather than needing to specify the group members individually. The mail may be sent by any underlying modality and the team mailbox automatically fills in the recipient list being used. The application may provide a unified view of content in the team mailbox to a requesting member. Furthermore, the application may apply one or more team mailbox policies to associated content.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
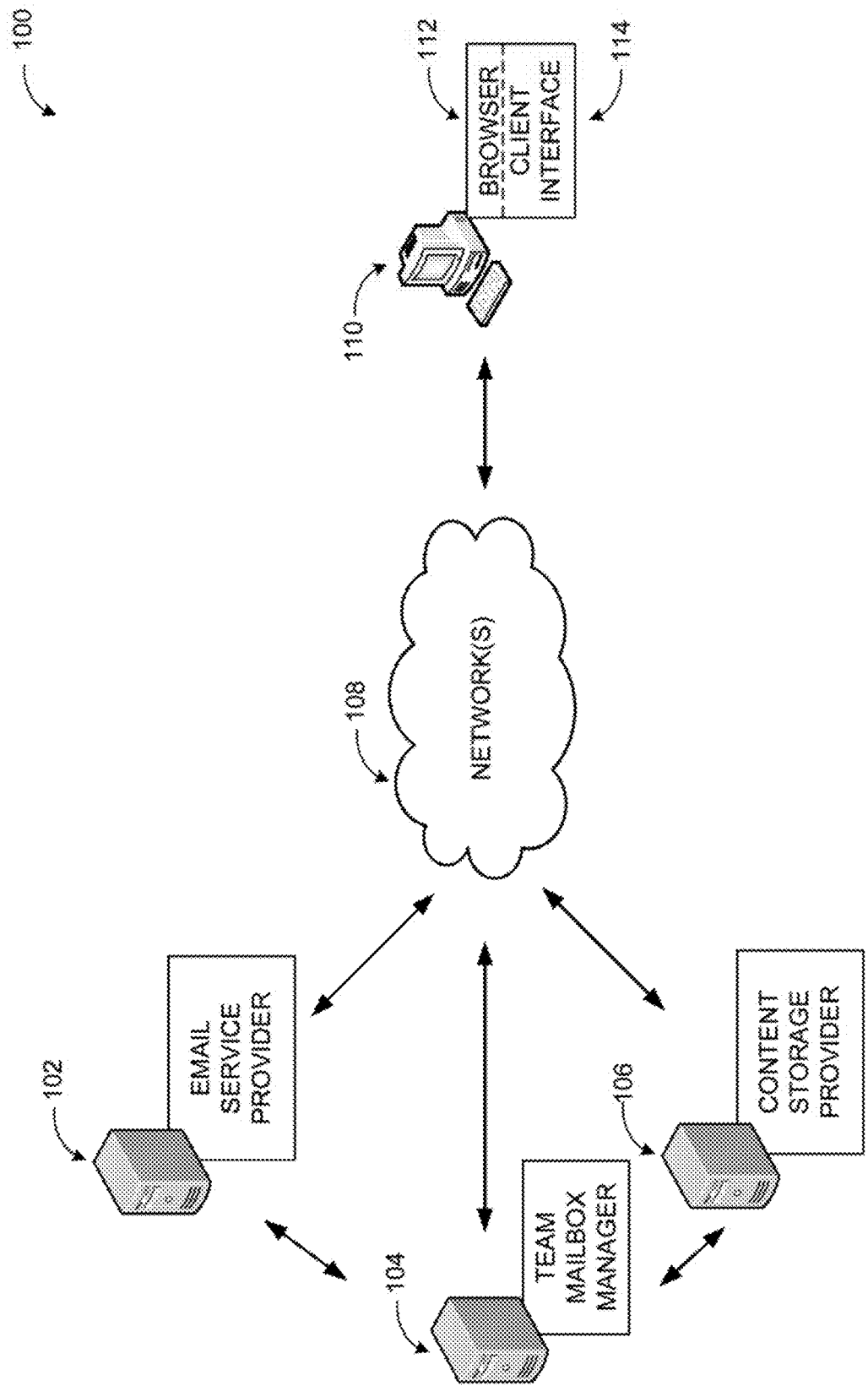
FIG. 1 illustrates a networked environment, where a communication application may manage a team mailbox integrating email repository and content management store services according to some embodiments.

As briefly described above a communication application may manage a team mailbox integrating email repository and content management store services. As discussed above, the application may create a team mailbox according to a received configuration from an administrator. The configuration may include team mailbox identifier information including name, alias, content management store (CMS) location, members, etc. The application may manage a membership including a list of members in the team mailbox according to received instructions from the administrator or a privileged member. In addition, the application may provide a unified view of content in the team mailbox. The unified view may display integrated content such as messages and documents. The modalities may include chat messaging, video/audio communications, file sharing, etc. The application may also apply one or more team mailbox policies associated with the content. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

An email repository may manage email messages for multiple user accounts. The repository may transmit and store email messages. The email repository may enforce organizational policies on email communications. In an example scenario, the email repository may limit message retention, enforce user access rights, monitor transmissions, etc. According to embodiments, a CMS may store and manage documents for users. Documents may include text, audio, video, images, etc. Documents may also include combined content such as text, audio, and video. The CMS may provide, synchronize, group, and manage documents for users. The CMS may also enforce policies on document access. Policies may include access rights and others. A team mailbox application may integrate the CMS and email repository services and features. The team mailbox may provide the integrated features through a unified view presenting members with a standardized interface for messages and associated documents.

Throughout this specification, the term "platform" may be a combination of software and hardware components for managing a team mailbox integrating email repository and CMS services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates a networked environment, where a communication application may manage a team mailbox integrating email repository and CMS services according to some embodiments. The computing devices and computing environments shown in diagram 100 are for illustration purposes. Embodiments may be implemented in various local, networked, and similar computing environments employing a variety of computing devices and systems.

In an example environment illustrated in diagram 100, a client interface 114 (e.g. a browser 112) executed on client device 110 may display a unified view of a communication application client interface. The unified view may display services provided on a team mailbox manager server 104 through network(s) 108. The server 104 may execute a communication application hosting integrated services provided by servers 102 and 106. The servers 102 and 106 may provide their respective services including email and document storage independently to the client device 110 and corresponding client interface 114. In some embodiments, a separate server may not be needed to manage team mailboxes. Thus, server 104 may not exist and servers 102 and 106 may communicate directly.

The communication application may integrate email message and document content by retrieving the content from the corresponding providers. The integrated content may be displayed to a member having access to the communication application thorough the unified view. The communication application may also enforce system policies on the integrated content. The application may inherit system policies from the email service provider 102, the content storage provider 106, or a third party and enforce the system policies upon the integrated content. In some implementations, the underlying mail service provider or content storage providers may implement/enforce the policies themselves.

Figure 2A:
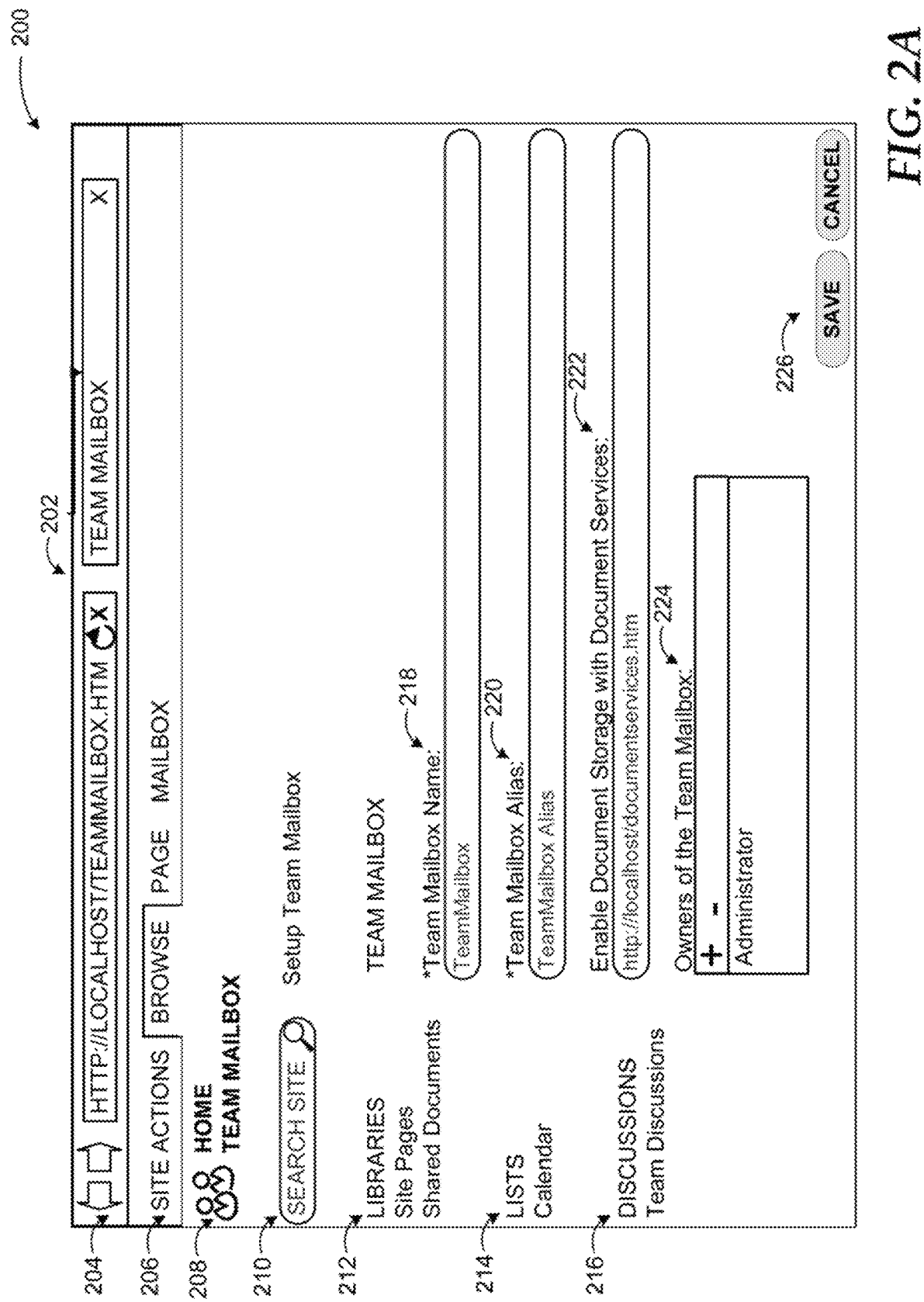
FIG. 2A illustrates an example user interface for configuring a team mailbox according to embodiments.

FIG. 2A illustrates an example user interface for configuring a team mailbox according to embodiments. Client interface 202 such as a browser displays content provided by the communication application. The communication application may provide configuration features for the team mailbox. The client interface may display navigation buttons 204 to provide quick access to prior and subsequently viewed pages.

In an example embodiment, a communication application may integrate messages from an email repository and associated documents from a CMS into content for members in a team mailbox. The communication application may be configured through the client interface from available features 206. The client interface may display a label 208 describing the presently displayed feature of the communication application. The client interface may also display unified view features of the communication application through common navigation features 210, 212, 214 and 216 across all available features of the communication application. The common navigation features 210 may include a search box to enable a user such as a member or an administrator of the team mailbox to search the team mailbox contents such as messages and associated documents. Libraries link 212 may lead a user to a CMS interface to peruse the associated documents. A lists link 214 may lead the user to calendar features and associated calendar information such as tasks for the team mailbox. Additionally, a discussions link 216 may lead the user to aggregated email messages according to a matching context such as matching subject lines. The aggregate email messages may be presented as conversations to members of the team mailbox.

In another embodiment, the client interface may display team mailbox configuration features of the communication application. The configuration options may include a name 218 for the team mailbox. The configuration options may also include an alias 220 for the team mailbox. Furthermore, an administrator or a team mailbox member may supply a location for the associated CMS through control 222. The location may be Uniform Resource Locator (URL) address of the CMS. An administrator or a member of the team mailbox may also define members of the team mailbox through control 224. The control may provide add or subtract functions to manage and identify members for the team mailbox. Finally, the communication application, through a client interface, may enable the configuration provider, such as an administrator or a member, to save or cancel the configuration of the team mailbox through controls 226.

Figure 2B:
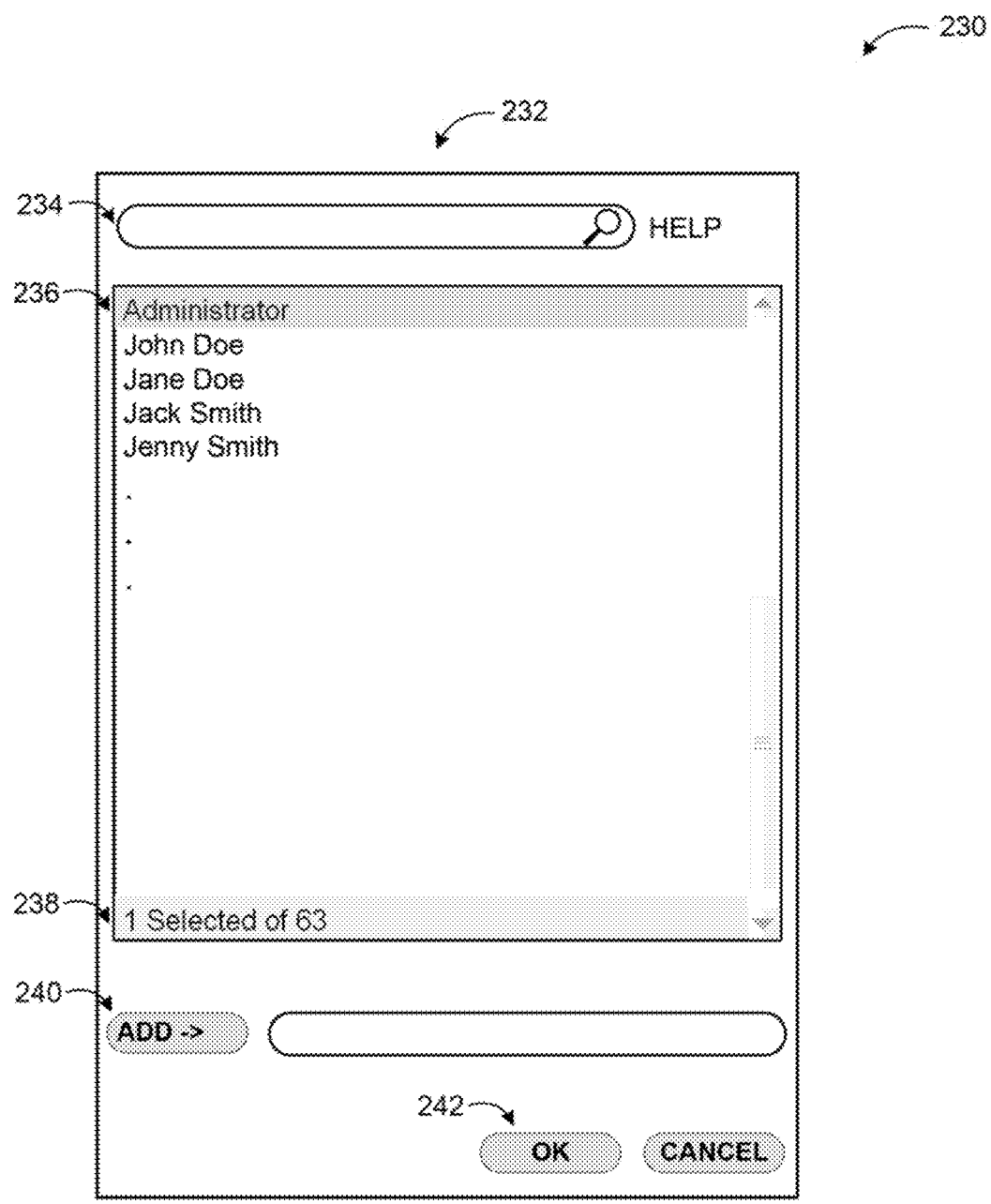
FIG. 2B illustrates additional components of the example user interface for configuring the team mailbox according to embodiments.

FIG. 2B illustrates additional components of the example user interface for configuring the team mailbox according to embodiments. Diagram 230 displays a membership definition pane 232. The membership definition pane 232 may launch upon clicking a membership definition control in client interface for the communication application when configuring a team mailbox. The membership definition pane 232 may have search control 234 to search user lists in either the email repository or the CMS or both. The pane 232 may also display a list of members belonging to the membership 236. The list may be adjustable to add or remove members.

An administrator may be enabled to manually add a member to the list of membership through an add control 240. The administrator may be enabled to type in the name or another identifier for the member into a text box of the control 240. Identifiers may include a user name or an email address. The communication application may automatically identify the member through the identifier by searching user databases of the email repository and the CMS. Finally the administrator may be enabled to save or discard a list of the members defining a membership for the team mailbox through controls 242.

Figure 3:
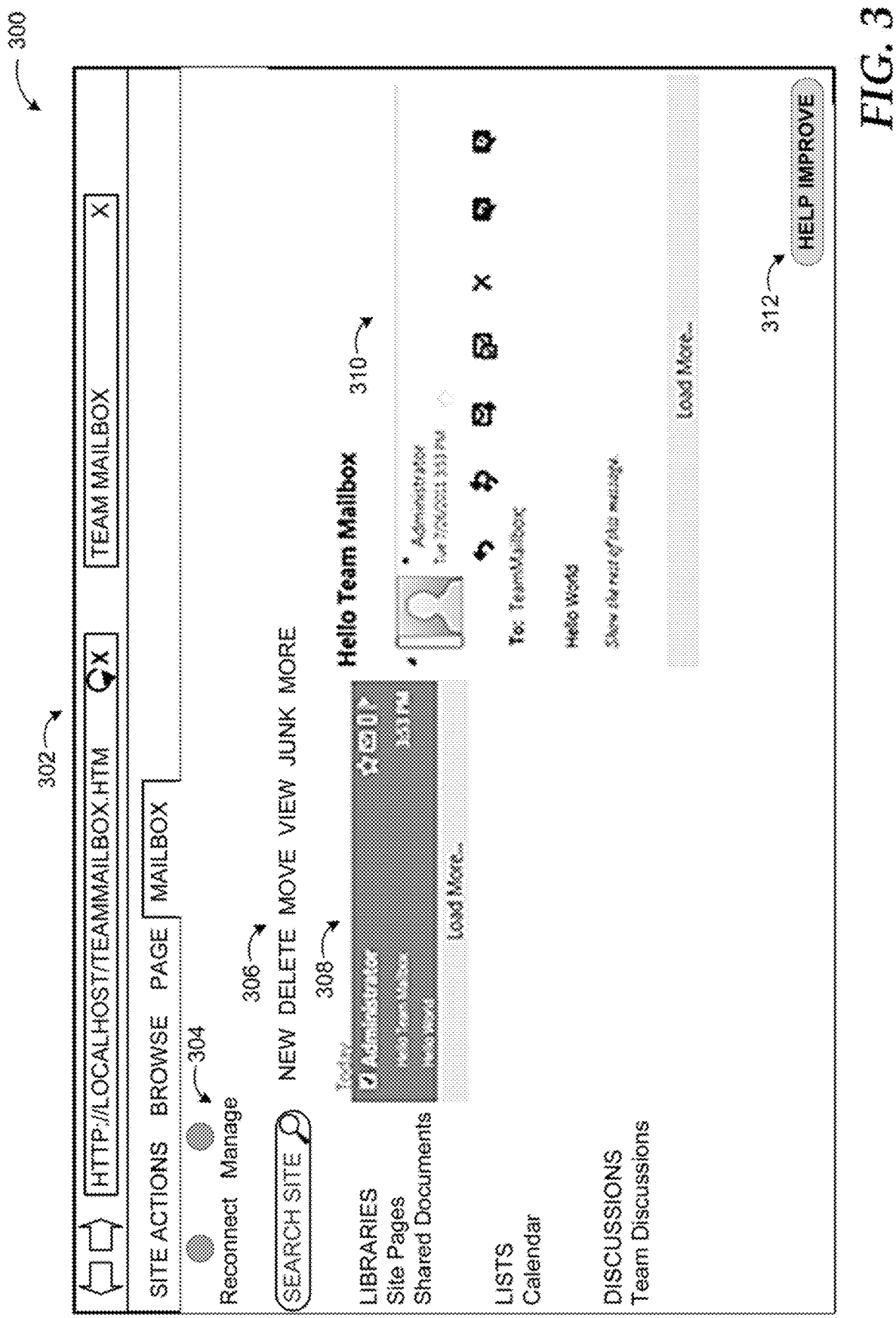
FIG. 3 illustrates another example user interface displaying a unified view for displaying content according to embodiments.

FIG. 3 illustrates another example user interface displaying a unified view for content according to embodiments. Diagram 300 displays a unified view 302 of content for the team mailbox through a client interface of the communication application. The content may include messages integrated with associated documents.

A member of the team mailbox may choose to manage the team mailbox through a manage control 304 and edit the team mailbox's configuration. Alternatively, the member may choose to reconnect to the team mailbox upon a loss of network connection. The reconnect feature may be used to relocate the team mailbox data when the address/location of the underlying content stores has changed, or alternatively if the location of the stores has not changed but the network connection was blocked for some reason. The unified view may provide standardized controls for the integrated messages through controls 306. The controls may include management actions such as new message, delete message, move message (to another folder or location), view message (to launch a viewer), "junk" a message (label as junk, or move to junk folder), more features (additional controls), etc. The unified view may also display summary message information 308 such as sender, subject line, time, attachment indicator, etc. Additionally, selecting the summary message information 308 may enable the unified view to present the selected message in a display pane 310 displaying the body of the message. The body of the message may include associated documents from a CMS. Associated documents may be determined according to matching member identifiers in the message information and documents in the CMS. Messages and documents may be matched according to context such as matching subject header of a message that is also found within the body of a document. Additionally, the unified view may display feedback features such as help improve control 312 to enable a member to suggest improvements about the unified view client interface of the communication application.

According to an embodiment, the communication application may create the team mailbox upon receiving properties and settings for the team mailbox. The properties and settings may include finer configuration information beyond identifier information. In an example scenario, properties may include a name, a description of the content, and a list of members in the membership. The communication application may start a creation flow using the settings to create the team mailbox. The application may also establish a link between the CMS and email repository. In addition, the application may provide a fault tolerance for one or more error cases during creation of the team mailbox.

According to other embodiments, the communication application may synchronize a list of members in the membership between the email repository and the CMS. The synchronization may be accomplished by choosing an architecture of the email repository having a master list of user access. The user access may define member privileges. Additionally, the application may enforce changes to the membership according to the master list of user access. Enforcement may entail limiting configurability and access to the team mailbox contents for the member.

In an alternative scenario, the communication application may synchronize the list of members by using a members list of the CMS. The application may also use a multi-system members list including multiple merged lists to synchronize the list of members. An example scenario may include using a merged list from the email repository and the CMS to synchronize the list of members. In yet another example scenario, the communication application may use a third party membership provider to synchronize the list of members. An example scenario may include access rights provider maintaining user definitions across an organization.

According to yet other embodiments, the communication application may present an integrated navigation menu including navigation links to the documents and messages. The application may also aggregate associated messages into conversations according to matching context. In an example scenario, the application may aggregate messages with matching subject lines into conversations. The application may also integrate associated documents into the conversations according to matching context. The context may be any matching identifier between messages and documents. Additionally, the application may display a list of conversations expandable to the associated messages and integrated associated documents.

Figure 4:
FIG. 4 illustrates another example user interface for editing the team mailbox and membership according to embodiments.

FIG. 4 illustrates another example user interface for editing the team mailbox and membership according to embodiments. Diagram 400 displays unified view 402 for editing a team mailbox subsequent to creation. According to embodiments a team mailbox may be edited to change its configuration information. In an example scenario, a client interface may display the team mailbox identifiers in edit controls to enable an administrator or a member to change the identifiers. The client interface of the communication application may display a pop-up information box 404 to display present action information. Additionally, the administrator or a member may be enabled to segregate team mailbox members according to access privileges. In another example scenario, the client interface may display an "all other members" control 406 to enable the administrator to add or delete members with different permission privileges to the team mailbox compared to members who are owners.

In an example scenario, the application may transmit a conversation using video conferencing to other members while displaying the conversation to a viewing member using a text messaging interface. Additionally, the application may launch a group instant messenger chat and/or mass email from within the team mailbox. The group instant message chat may include a chat history view and an associated documents view. The mass email may include an email message to one or more members in the member list.

According to yet other embodiments, the communication application may enforce retention and access policies on the associated documents and messages. In an example scenario, the application may limit access to documents and messages to a specific group of members. In another example scenario, the application may retain documents and/or messages for a predetermined time period. Additionally, the application may synchronize the retention and access policies between the email repository and CMS according to policies of the email repository. In another example scenario, the application may synchronize the retention and access policies between the email repository and the CMS according to policies of the CMS. It should be noted, that the team mailbox is configured to provide a view and it is the underlying repository that actually implements retention/enforcement.

The example scenarios and schemas in FIGS. 2 and 4 are shown with specific components, data types, and configurations. Embodiments are not limited to systems according to these example configurations. Managing a team mailbox integrating email repository and CMS services may be implemented in configurations employing fewer or additional components in applications and user interfaces. Furthermore, the example schema and components shown in FIGS. 2 and 4 and their subcomponents may be implemented in a similar manner with other values using the principles described herein.

Figure 5:
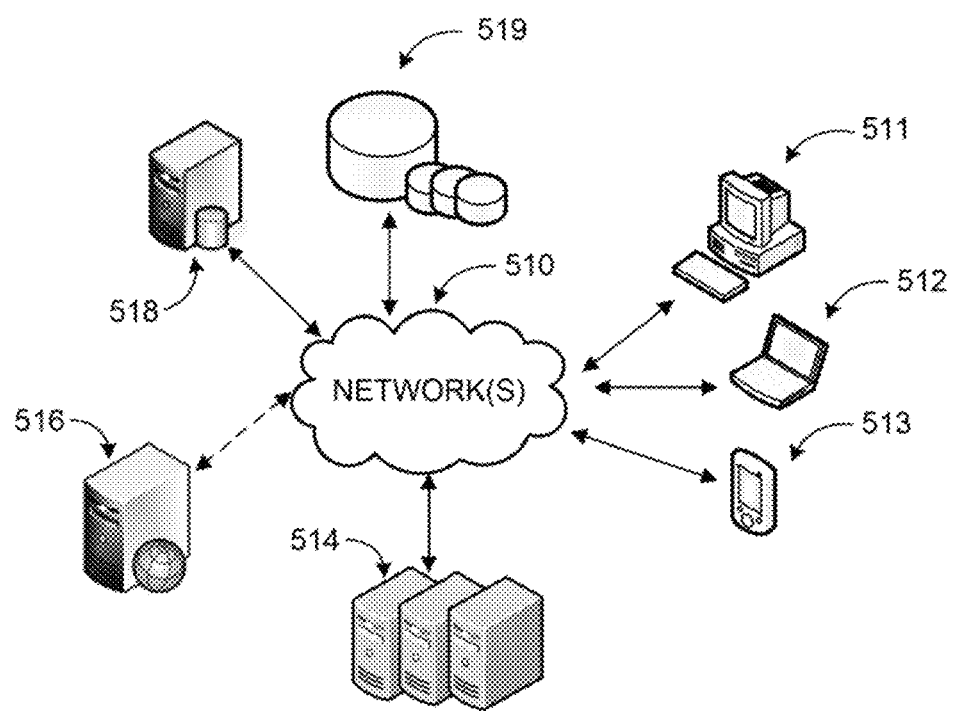
FIG. 5 is a networked environment, where a system according to embodiments may be implemented.

FIG. 5 is a networked environment, where a system according to embodiments may be implemented. A team mailbox may be managed by a communication application integrating email repository and CMS services over one or more servers 514 or a single server (e.g. web server) 516 such as a hosted service. The communication application may communicate with client interfaces on individual computing devices such as a smart phone 513, a laptop computer 512, or desktop computer 511 ('client devices') through network(s) 510.

As discussed above, a communication application may create a team mailbox according to an administrator or a member provided configuration information. The application may display the content of the team mailbox through a unified view standardizing access to the integrated message and document content.

Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to manage a team mailbox. Furthermore, the networked environments discussed in FIG. 5 are for illustration purposes only. Embodiments are not limited to the example applications, modules, or processes.

Figure 6:
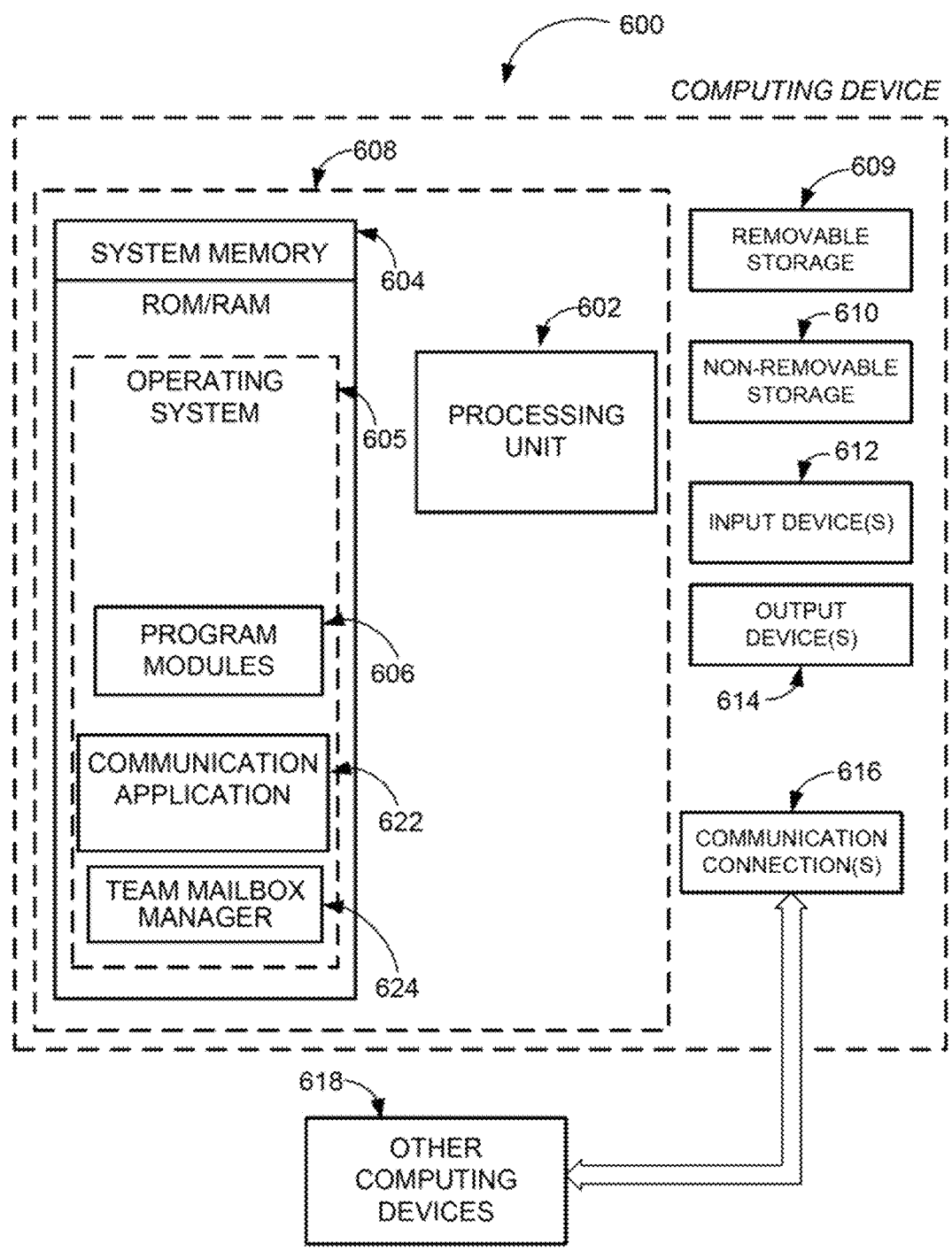
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Washington. The system memory 604 may also include one or more software applications such as program modules 606, communication application 622, and team mailbox manager module 624.

Communication application 622 may provide a team mailbox according to embodiments. The team mailbox manager module 624 may create and manage the team mailbox. The team mailbox manager module 624 may also integrate messages and associated documents from email repository and CMS services. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
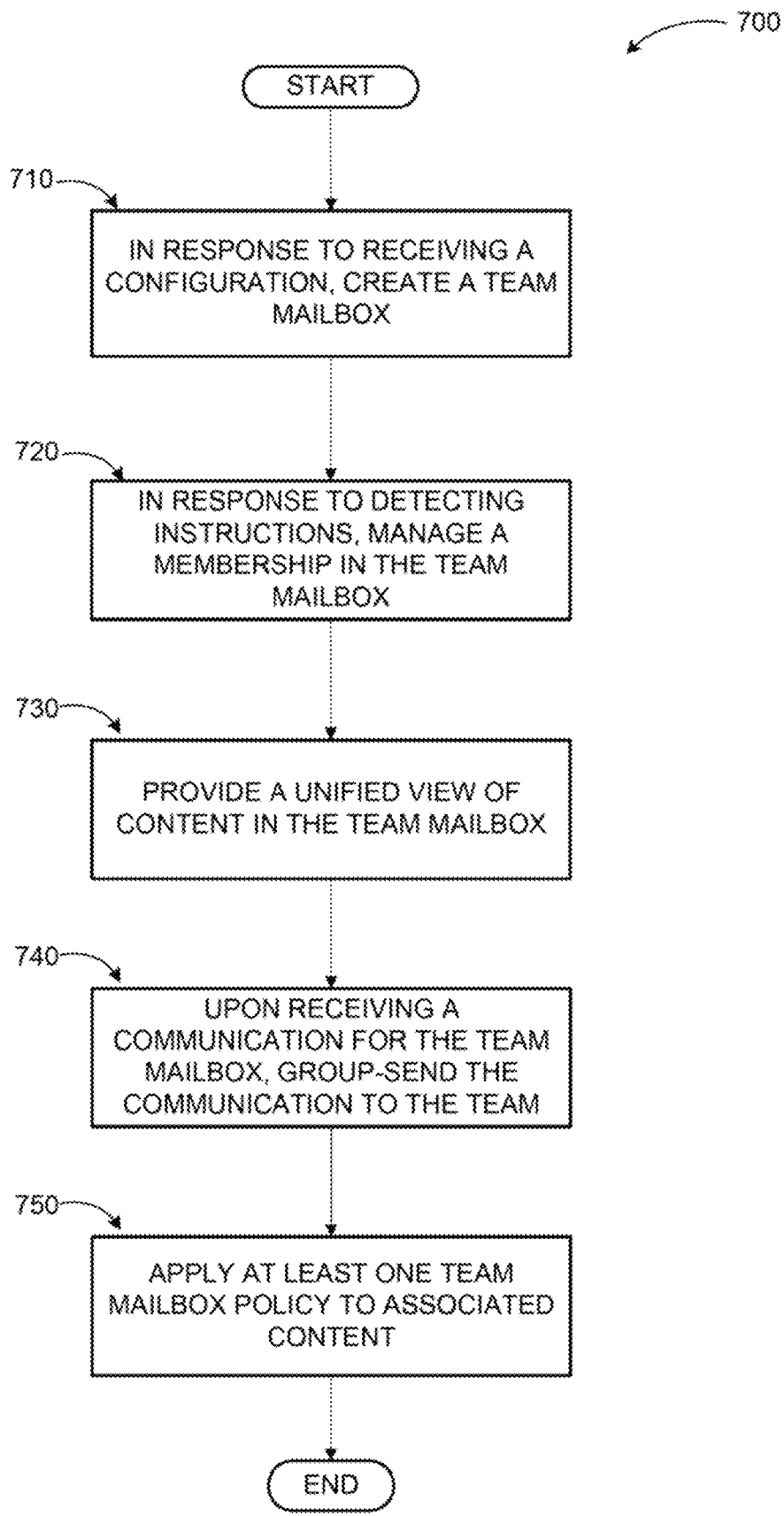
FIG. 7 illustrates a logic flow diagram for an overall process of employing a team mailbox for integrating email and content management store services according to embodiments.

FIG. 7 illustrates a logic flow diagram for an overall process of employing a team mailbox for integrating email and content management store services according to embodiments. Process 700 may be implemented by a communication application in some examples.

Process 700 may begin with operation 710 creating a team mailbox in response to receiving a configuration from an administrator or a member with sufficient privileges to create a team mailbox. At operation 720, the communication application may manage a membership in the team mailbox in response to detecting instructions from the administrator or the member. The instructions may include a list of members defining users with privileges to access the team mailbox. As part of providing a team mailbox, the communication application may also provide a unified view of content in the team mailbox. The content may include messages integrated with associated documents at operation 730. In response to receiving a communication (email, conference request, text message, etc.), the communication application may group-send the communication to the team members without a need for the sender to individually identify the members at operation 740. The modality of the communication may be preserved. The modalities may include text messaging, video conferencing, audio conferencing, file sharing, etc. At operation 750, the communication application may apply one or more mailbox policies to associated content.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Managing a team mailbox to provide integrated email repository and CMS services may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to manage a collaboration service, the method comprising:
providing the collaboration service that integrates services of a message repository and a content management store to a group of users;
providing a unified view of content associated with the collaboration service to be displayed through a client interface, the content comprising messages retrieved from the message repository and documents retrieved from the content management store, wherein the messages and the documents are searchable within the collaboration service; and
upon receiving a communication addressed to a team comprising a subset of the group of users within the collaboration service, group-sending the communication to the team.

2. The method of claim 1, further comprising:
providing a navigation menu within the unified view, wherein the navigation menu comprises a search box and one or more navigation links.

3. The method of claim 2, wherein the search box enables the messages and the documents within the collaboration service to be searched for.

4. The method of claim 2, wherein the one or more navigation links include a first navigation link to the messages, a second navigation link to the documents, and a third navigation link to a calendar comprising tasks associated with the group of users.

5. The method of claim 1, further comprising:
providing a membership definition pane associated with the collaboration service to be displayed through the client interface to an administrator within the group of users.

6. The method of claim 5, wherein the membership definition pane enables the administrator to define one or more of:

the group of users,
one or more teams comprising one or more subsets of the group of users, and
access privileges associated with the messages and the documents for each user within the group of users or for each of the one or more teams.

7. The method of claim 5, wherein the membership definition pane includes a search control to enable the administrator to search user lists of the message repository and the content management store.

8. The method of claim 1, further comprising:
synchronizing a list of users within the group of users between the message repository and the content management store.

9. The method of claim 8, wherein the synchronization comprises employment of one or more of:
a master list of user access from the message repository;
a user list from the content management store;
a multi-master system including multiple merged lists from the message repository and the content management store; and
a user list from a third party membership provider.

10. The method of claim 1, further comprising:
integrating one or more of the documents into one or more of the messages based on a matching context of the one or more documents to the one or more messages.

11. The method of claim 10, further comprising:
aggregating two or more of the messages into a conversation based on a matching context between the two or more of the messages.

12. The method of claim 11, further comprising:
providing the conversation in a list of conversations within the unified view, wherein the list of the conversations is expandable to the aggregated messages and the integrated documents.

13. A computing device to manage a collaboration service, the computing device comprising:
a communication interface configured to facilitate communication among the computing device, a message repository, and a content management store;
a memory configured to store instructions; and
a processor coupled to the communication interface and the memory, wherein the processor in conjunction with the instructions is configured to:
provide the collaboration service that integrates services of the message repository and the content management store to a group of users;
provide a unified view of content associated with the collaboration service to be displayed through a client interface, the content comprising messages retrieved from the message repository and documents retrieved from the content management store, wherein the messages and the documents are searchable within the collaboration service; and
upon receiving a communication addressed to a team comprising a subset of the group of users within the collaboration service, group-send the communication to the team.

14. The computing device of claim 13, wherein the processor is further configured to:
provide summary message information associated with each of the messages within the unified view.

15. The computing device of claim 14, wherein the processor is further configured to:
in response to detecting a selection of the summary message information associated with a message from the messages, providing a body of the message to be displayed within the unified view, wherein the body includes one or more of the documents integrated into the message based on a matching context of the one or more documents to the message.

16. The computing device of claim 13, wherein the processor is further configured to launch a group instant messenger chat from within the collaboration service, wherein the group instant messenger chat includes a chat history view and an associated documents view.

17. The computing device of claim 13, wherein the processor is configured to group-send the communication to the team using a modality of the communication that includes one of text messaging, video conferencing, audio conferencing, and file sharing.

18. A system to manage a collaboration service, the system comprising:
a first server associated with a message service provider configured to provide services of a message repository;
a second server associated with a content storage provider configured to provide services of a content management store; and
a third server communicatively coupled to the first server and the second server, the third server comprising:
a memory configured to store instructions; and
a processor coupled to the memory, wherein the processor in conjunction with the instructions is configured to:
provide the collaboration service that integrates services of the message repository and the content management store to a group of users;
provide a unified view of content associated with the collaboration service to be displayed through a client interface, the content comprising messages retrieved from the message repository and documents retrieved from the content management store, wherein the messages and the documents are searchable within the collaboration service; and
upon receiving a communication addressed to a team comprising a subset of the group of users within the collaboration service, group-send the communication to the team.

19. The system of claim 18, wherein an access to the messages and the documents is limited based on a set of retention and access policies associated with one or more of the collaboration service, the message repository, the content management store, and a third party policy provider.

20. The system of claim 18, wherein the processor is further configured to:
in response to detecting a new location of one or both of the message repository and the content management store, reestablish a connection between the collaboration service and the one or both of the message repository and the content management store.

* * * * *